E. ALLEN.

Revolver.

No. 1,738.

Reissued Aug. 16, 1864.

N. PETERS, PHOTO-LITHOGRAPHER, WASHINGTON, D. C.

UNITED STATES PATENT OFFICE.

ETHAN ALLEN, OF WORCESTER, MASSACHUSETTS.

IMPROVEMENT IN REVOLVING FIRE-ARMS.

Specification forming part of Letters Patent No. 21,400, dated September 7, 1858; Reissue No. 1,738, dated August 16, 1864.

DIVISION B.

*To all whom it may concern:*

Be it known that I, ETHAN ALLEN, of Worcester, in the county of Worcester and State of Massachusetts, have invented certain Improvements in Repeating Fire-Arms; and I do hereby declare that the following is a full and exact description thereof, reference being had to the accompanying drawings, and to the letters of reference marked thereon, in which drawings—

Figure 1:
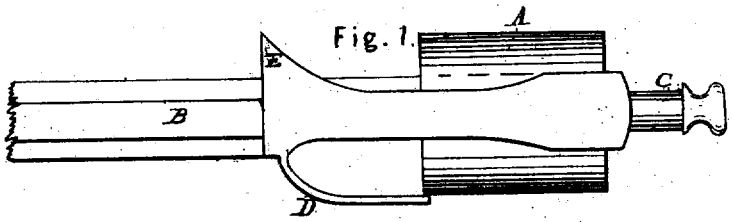
Figure 2:
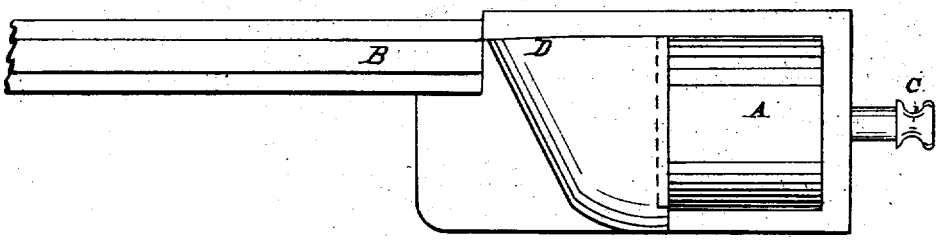
Figure 3:
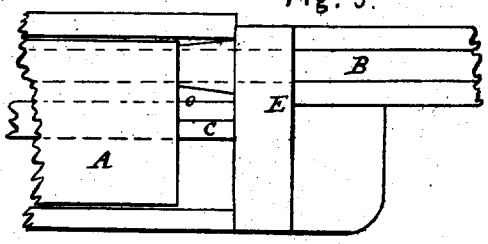
Figure 4:
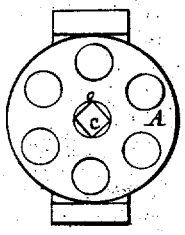

Figure 1 represents the chambered cylinder, its case, and part of the barrel. Fig. 2 is a left-hand side view of the same. Fig. 3 is a right-hand side view of the improvements. Fig. 4 shows a vertical cross-section taken through at the front end of the cylinder.

Similar letters denote the same parts in all the figures.

My improvements relate particularly to the repeating fire-arm or revolver.

It has always been a great source of trouble in using arms of this description having a revolving cylinder with chambers for receiving the charges and a discharge-barrel in front that a considerable quantity of the gas or smoke residuum from the charge escapes laterally through the joint between the chamber and the barrel, a part of which, striking against the surface of the bearing upon which the chamber rotates, is deflected by that surface directly into the joint between it and the revolving chamber, depositing therein the residuum from the combustion of the powder, which soon clogs the joints thus situated and materially interferes with the operation and good condition of the arm.

To remedy this difficulty is the object of my invention, which consists in forming at the extremity of the bearing-surface, at that point against which the current of gas impinges, a recess or receding portion of the surface, the face of which is inclined to the direction of the current that impinges upon it, so that the current passes by and beyond the joint to be protected, and is then deflected outward away from the joint, by which means the deposit of dirt in the joint is prevented.

In the particular application of my invention which is shown in the drawings, representing that construction of repeating cylinder-arms in which the cylinder revolves upon a center-pin extending through it, I form that part of the center-pin C that projects in front of the cylinder A for the purpose of protecting the joint between the center-pin and the chamber with two inclined surfaces, with the vertex O of the angle formed by them toward the rear end of the bore of the discharge-barrel, so that the gas or smoke which is directed down against this pin shall split upon the angle and be shed off laterally, instead of part of it striking into the annular crevice around the pin, as it would tend to do if the projecting part of the pin were of cylindrical form, like the rest. This is one mode in which I have contemplated the application of my invention, and I consider that the operation will be most perfectly performed by the use of two inclines placed with reference to the joint of the cylinder to be protected, as above described; but it is obvious that the same principle and mode of operation may be applied with the same effect to any other form of joint similarly situated with regard to the escaping current of gas, and also that my invention may be practiced substantially, though not in the best manner, by the use of a single incline similarly placed with regard to the joint to be protected.

What I claim as my invention, and desire to secure by Letters Patent, is—

The method of protecting the joints from fouling between the revolving-cylinder breech and the stationary parts contiguous thereto in repeating fire-arms by means of the inclined recess or recesses, or their equivalent, arranged and operating substantially as described.

ETHAN ALLEN.

Witnesses:
SULLIVAN FOREHAND,
GEORGE W. FAIRFIELD.